(12) United States Patent
Clark et al.

(10) Patent No.: US 6,214,633 B1
(45) Date of Patent: Apr. 10, 2001

(54) SYSTEM FOR CONTROLLING LIGHT INCLUDING A MICROMACHINED FOUCAULT SHUTTER ARRAY AND A METHOD OF MANUFACTURING THE SAME

(75) Inventors: Rodney L. Clark, Gurley; John R. Karpinsky, Huntsville, both of AL (US)

(73) Assignee: MEMS Optical Inc., Huntsville, AL (US)

( * ) Notice: Subject to any disclaimer, the term of this patent is extended or adjusted under 35 U.S.C. 154(b) by 0 days.

(21) Appl. No.: 09/141,603

(22) Filed: Aug. 28, 1998

Related U.S. Application Data
(60) Provisional application No. 60/056,241, filed on Aug. 28, 1997.

(51) Int. Cl.[7] .................................................... H01L 21/00
(52) U.S. Cl. .................................. 438/48; 355/53; 355/67
(58) Field of Search ................................... 355/53, 67, 71, 355/77; 156/630, 663; 430/311, 314; 438/48, 49

(56) References Cited

U.S. PATENT DOCUMENTS

| | | | |
|---|---|---|---|
| 4,212,519 | * | 7/1980 | Drexhage et al. ................... 350/362 |
| 4,584,056 | * | 4/1986 | Perret et al. ......................... 156/630 |
| 4,755,415 | | 7/1988 | Iijima et al. . |
| 4,854,678 | | 8/1989 | Kitano et al. . |
| 4,887,104 | | 12/1989 | Kitano et al. . |
| 5,629,918 | | 5/1997 | Ho et al. . |
| 5,675,402 | * | 10/1997 | Cho et al. ............................. 355/71 |

* cited by examiner

*Primary Examiner*—David Nelms
*Assistant Examiner*—Dung Le

(57) ABSTRACT

An apparatus for controlling light includes a non-transparent surface for blocking incident light, an array of first lenses for focusing the incident light upon the non-transparent surface, an array of shutters corresponding to the array of first lenses and positioned on the non-transparent surface for controlling passage of the incident light through the non-transparent surface, and an array of second lenses corresponding to the array of shutters for collimating the incident light passing through the shutters. The shutters are separated from the first lenses by a distance equal to a focal distance of the first lenses such that the incident light is focused by the first lenses onto the shutters. As such, the shutters may be opened and closed to control the intensity of the incident light passing therethrough. Electrostatic comb drives corresponding to the array of shutters may be used for actuating the shutters, where the electrostatic comb drivers each include two stationary stators that are separated by a distance at least as great as the largest shutter openings, and where the shutter includes two sliders that move relative to the stationary stators based on a magnitude of a voltage applied thereto. Alternatively, return springs may be used for biasing the shutters in an opened or closed position, and micromachine actuators for controlling actuation of the shutters. In either case, the shutters may be Foucault shutters, or other known shutters.

18 Claims, 4 Drawing Sheets

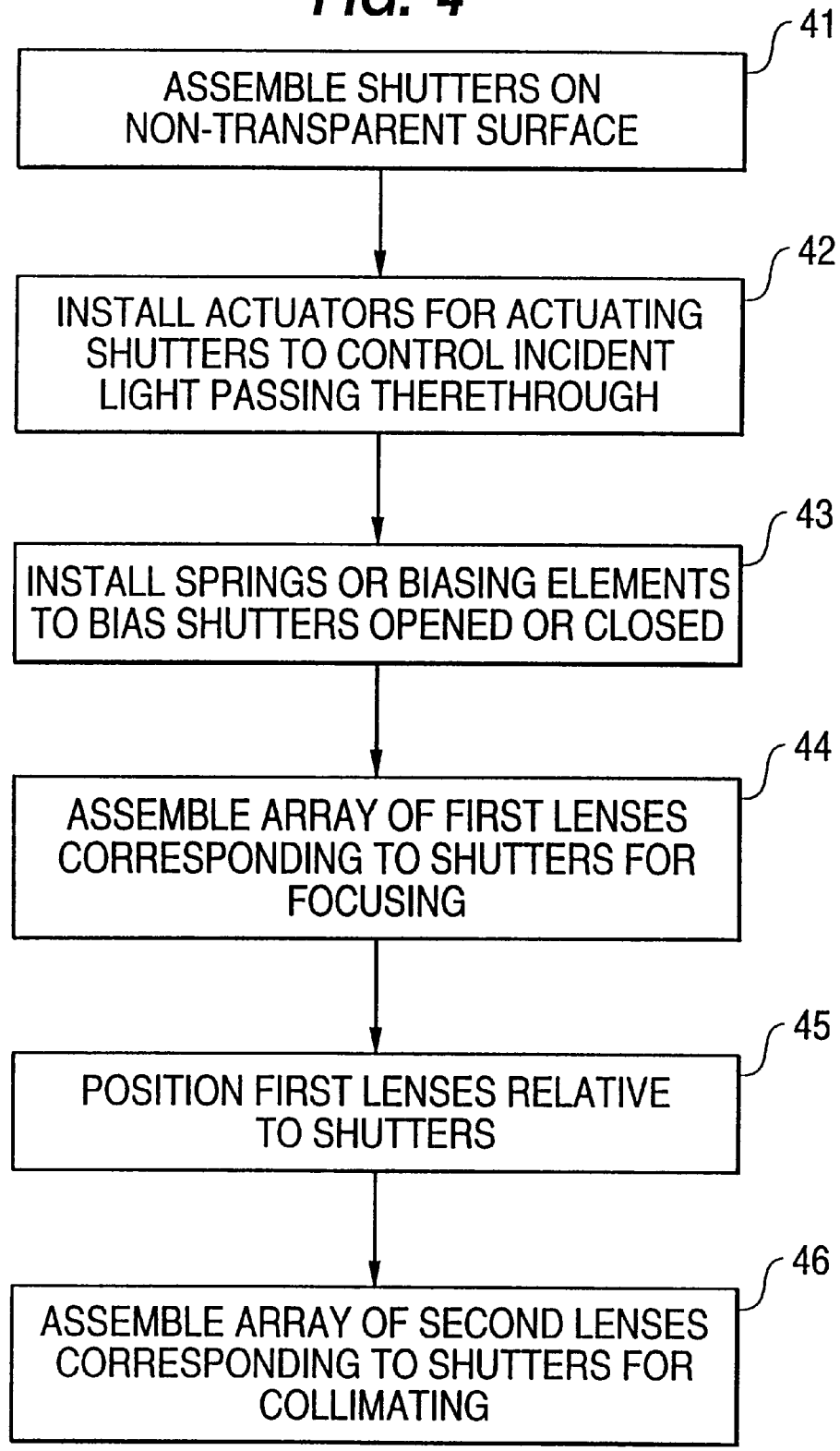

SYSTEM FOR CONTROLLING LIGHT INCLUDING A MICROMACHINED FOUCAULT SHUTTER ARRAY AND A METHOD OF MANUFACTURING THE SAME

This application claims priority on provisional application Ser. No. 60/056,241 filed on Aug. 28, 1997, the entire contents of which are hereby incorporated by reference.

FIELD OF THE INVENTION

The present invention is directed to providing intensity modulation using micromachine technology. In particular, intensity modulation is accomplished by at least one microscopic shutter. The shutters are fabricated using lithographic micromachining techniques. The shutters are incorporated into a system for controlling light, each shutter being located at the focal point of a microlens array used to deliver light to, and direct light from, a focal plane of the array.

BACKGROUND OF THE INVENTION

Conventionally, intensity modulation devices included liquid crystals and tiltable mirrors. Such intensity modulators have disadvantages in that light throughput efficiency and light power handling capacity are insufficient and stray light noise is too high. In particular, the liquid crystal display suffers most greatly regarding the light throughput efficiency and light power handling capacity, while the tilting micromirrors suffer from stray light noise.

In addition, although conventional intensity modulation devices such as liquid crystals are well-suited for large applications, they are not particularly well-suited for regulating the intensity of light on a microscopic scale. Rather, their large size renders them incapable of efficiently operating to block incident light in applications requiring fine precision intensity regulation on a small scale.

In the absence of a device capable of regulating the intensity of light on a microscopic scale, microscopic devices requiring such light regulation have generally relied upon pulsed laser light. Similarly, to digitalize conventional devices that are optically driven without increasing the size of those devices, pulsed laser light has been relied upon. For instance, when printing devices are digitalized, laser diodes have been conventionally used to regulate laser beams incident upon special paper where images are to be formed.

However, disadvantages frequently result when laser beams are required. For instance, when digitalizing printing devices as described above, an expensive type of special paper is required for printing and power consumption of the printing device must be increased to generate laser beams.

SUMMARY OF THE INVENTION

It is an object of the present invention to overcome all of the disadvantages noted above. In particular, the present invention may overcome these problems by using a true shutter. In other words, when the shutter in accordance with the present invention is open, 100% of the light is through put efficiently. When closed, all of the light is blocked, and not redirected as in the mirror systems.

Other and further objects, features and advantages of the present invention will be set forth in the description that follows, and in part will become apparent from the detailed description, or may be learned by practice of the invention.

To achieve these and other advantages and in accordance with the purpose of the present invention, as embodied and broadly described, the present invention includes an apparatus for controlling light comprising a non-transparent surface for blocking incident light, an array of first lenses for focusing the incident light upon the non-transparent surface, an array of shutters corresponding to the array of first lenses and positioned on the non-transparent surface for controlling passage of the incident light through the non-transparent surface, and an array of second lenses corresponding to the array of shutters for collimating the incident light passing through the shutters. In this apparatus, the shutters are separated from the first lenses by a distance equal to a focal distance of the first lenses such that the incident light is focused by the first lenses onto the shutters. As such, the shutters may be opened and closed to control the intensity of the incident light passing therethrough.

The apparatus may further comprise electrostatic comb drives corresponding to the array of shutters for actuating the shutters, where the electrostatic comb drives each include two stationary stators that are separated by a distance at least as great as the largest shutter openings, and the shutter include two sliders that move relative to the stationary stators based on a magnitude of a voltage applied thereto. Alternatively, the apparatus may include return springs for biasing the shutters in an opened or closed position, and micromachine actuators for controlling actuation of the shutters. In either case, the shutters may be Foucault shutters, or other known shutters.

In addition, the present invention includes a method of manufacturing a micromachine Foucault shutter array that includes assembling an array of shutters on a non-transparent surface for controlling passage of incident light through the non-transparent surface, assembling an array of first lenses corresponding to the array of shutters for focusing incident light upon the non-transparent surface, positioning the array of first lenses relative to the non-transparent surface such that the incident light is focused upon the shutters by the first lenses, and assembling an array of second lenses corresponding to the array of shutter for collimating the incident light passing through the shutters. Electrostatic comb drives and/or micromachine actuators may be installed to control actuation of the shutters, thereby opening and closing the shutters to control the intensity of incident light passing therethrough. Electrostatic comb drives include two stationary stators that are separated by a distance at least as great as the largest possible opening in the shutters, where the shutters each include two sliders that move relative to the stationary stators based on a magnitude of a relative voltage applied thereto. Return springs may also be installed for biasing the shutter in an opened or closed position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in this art from this detailed description.

BRIEF DESCRIPTION OF THE DRAWINGS

The present invention will become more fully understood from the detailed description given hereinbelow in the accompanying drawings which are given by way of illustration only and thus are not limited to the present invention:

FIGS. 3C and 3D show exemplary pictures of an interrelationship between stators 24 and slides 26, each having comb parts that can be moved together or apart depending upon whether the shutter is opened or closed;

FIG. 4 shows a flowchart corresponding to an exemplary method of manufacturing a micromachine Foucault shutter array according to the present invention.

DETAILED DESCRIPTION OF THE PREFERRED EMBODIMENTS

Figure 1:
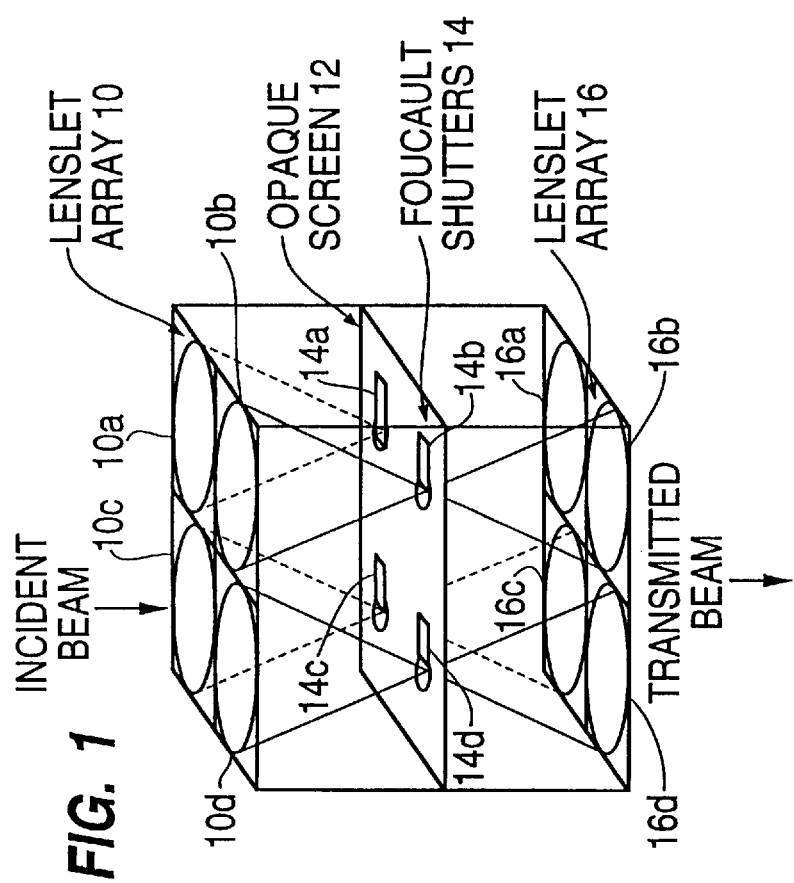
FIG. 1 shows a lens array in conjunction with the Foucault shutter array of the present invention.

As shown in FIG. 1, the microlens array 10 in accordance with the present invention is used to cause incident light to pass into and out of focus. In particular, a first refractive lenslet array 10 causes light incident thereon to be focussed onto an opaque screen 12 located at a focal plane of the lenslet array 10. The opaque screen 12 has an array of Foucault shutters 14, each corresponding to a refractive or diffractive lens of the lenslet array 10. Thus, light on the focal plane may only pass through an opening provided by the Foucault shutter. Depending upon the state of the corresponding Foucault shutter, the light diverges from the focal plane until it intercepts a second refractive or diffractive microlens array 16, which collimates this light to form a transmitted beam.

As can be seen in FIG. 1, the amount of light delivered to the second lenslet array 16 is controlled by the state (open/closed) of a corresponding Foucault shutter in the array 14. As shown therein, a Foucault shutter 14a is sufficiently closed such that no light passes from the lens 10a to the lens 16a. Foucault shutters 14b, 14c are partially open such that some light passes from lenses 10b, 10c to lenses 16b, 16c, respectively. A Foucault shutter 14d is sufficiently open that 100% throughput is achieved from lens 10d to lens 16d. The different degrss of light throughput result in the desired intensity modulation. Another method of performing intensity modulation is to vary the time that the shutter is open, with short shutter open time corresponding to low light level and long shutter open time corresponding to bright light level.

Figure 2:
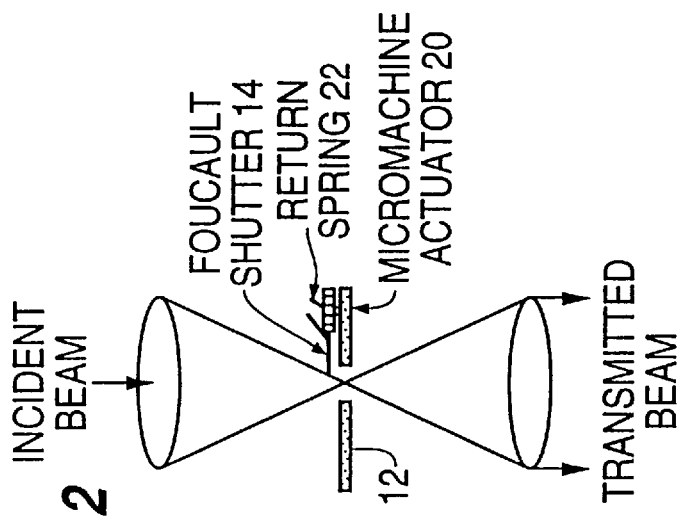
FIG. 2 shows a single element of the array shown in FIG. 1 in more detail.

FIG. 2 is a more detailed view of a single channel of the configuration shown in FIG. 2. The Foucault shutter can be either biased in a closed position by a return spring 22 or biased in an open position by a return spring. The state of the Foucault shutter is controlled by a micromachine actuator 20.

In employing a Foucault shutter array in accordance with the present invention, it is advantageous to use shutters which do not require mechanical interaction for control thereof. A suitable shutter, employed in different application then providing intensity modulation, is a known electrostatic drive lateral comb interdigitated drive. With lateral comb drives, the activation is parallel with the substrate. The force generated by the lateral comb drives is independent of the relative position of the two electrode plates, while the plates overlap. Lateral comb drives can produce large deflections necessary for use in, for example, a gyroscopic application. For example, displacements of 20 microns have been achieved.

Figure 3B:
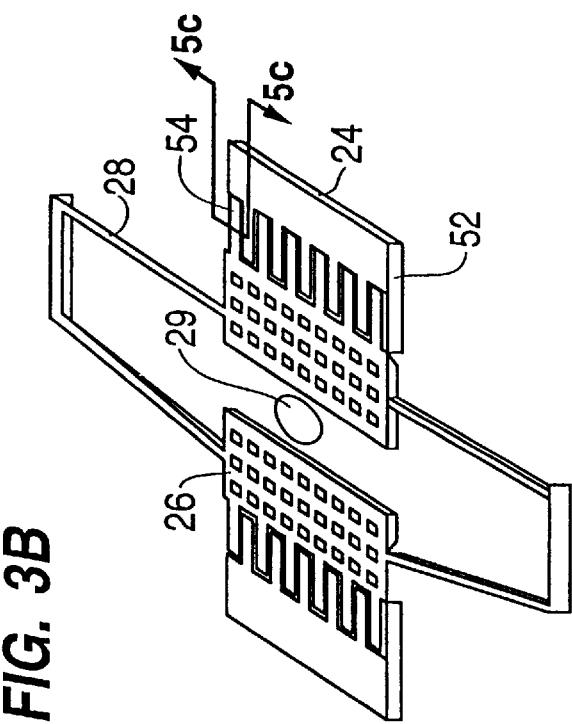
FIG. 3B shows electrostatic drive mechanism of a single Foucault shutter in an open position.
Figure 3A:
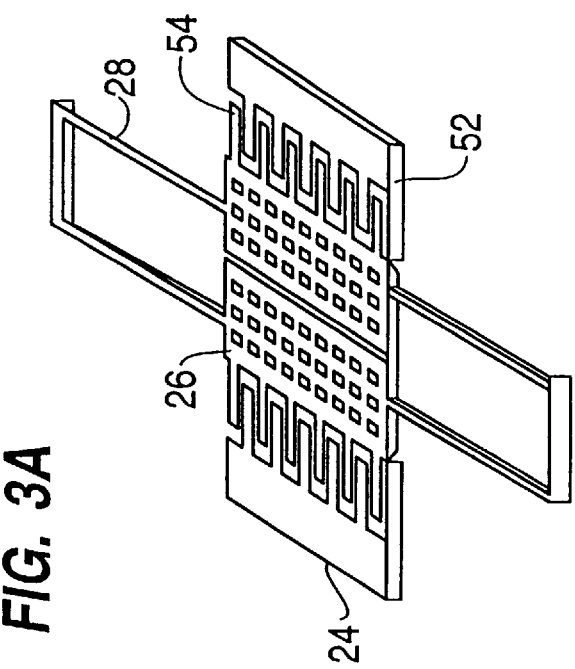
FIG. 3A shows in a single pixel detail the electrostatic drive mechanism of the single Foucault shutter in the closed position.

In the preferred embodiment of the present invention, a lateral comb drive is adapted for use as the actuation mechanism for the Foucault shutter array 14. A shutter incorporating lateral comb drives for use with the present invention is shown in FIGS. 3A and 3B. The shutter includes two stationary stators 24 and two sliders 26, the two slides 26 remaining free to move relative to the stationary stators 24. The sliders 26 form the Foucault shutter, while the stators 24 control the spacing therebetween. As shown in FIGS. 3C and 3D, the stators 24 and slides 26 each have comb parts, the proximity of the comb parts of the shutter and the comb parts of the actuator being based on whether the shutter is opened or closed.

When no voltage is applied, the ribbon springs 28 hold the two sliders 26 together in a closed position, as shown in FIG. 3A. When a voltage is applied between the sliders 26 and the stators 24, the two sliders 26 move toward their respective stators, as can be seen in FIG. 3B. As the sliders 26 move apart, a small aperture 29 is revealed, as shown in FIG. 3B. This aperture 29 serves as the shutter opening and can be controlled by varying the magnitude of the applied voltage. The size of this aperture will determine the amount of the light beam passing therethrough.

Therefore, intensity modulation of light may be effectively achieved on a microscopic scale using a true shutter. Electrical forces of the comb drive provide the movement required for the requisite opening of the shutter. When the voltage is removed, the shutter will return to the closed position. Alternatively, when the voltage is applied, the shutter cannot be closed, and when the voltage is removed, the shutter could be opened by the springs.

By using the shutter to achieve intensity modulation of light on a microscopic scale, the present invention may either regulate the transmission or reflection of light, or both. For instance, if the surface of the shutter is neither transparent nor reflective, the present invention modulates only the transmission of light incident thereupon.

However, in an alternative embodiment where the shutter surface is reflective, the present invention may be utilized to modulate either the transmission or reflection of light incident thereupon. More specifically, in this alternative embodiment, although light is transmitted when the shutter is opened, light is reflected from the surface of the shutter when the shutter is closed. As such, both the reflected and transmitted light are modulated based on the actuation of the shutter.

Furthermore, an alternative embodiment includes a single stator and a single slider, the single slider moving relative to the single stator similar to the operation described above with respect to a pair of sliders.

An exemplary application of the above-described shutter involves digitalized printing devices. With these shutters, regular light may be modulated to achieve digital signals appropriate for digital imaging. Thus, printing devices may be fitted with these devices to achieve digitalization, without requiring pulsed laser diodes, laser light or the special paper conventionally required of digital printing devices.

FIG. 4 shows a flowchart corresponding to an exemplary method of manufacturing a micromachine Foucault shutter array according to the present invention. In step 41, an array of shutters 14 is assembled on a non-transparent surface 12 for controlling passage of incident light through the non-transparent surface 12. In steps 42 and 43, actuators 20 are installed for actuating the shutters 14 to control incident light passing therethrough, and springs 22 or other biasing elements are installed to bias the shutter 14 in an opened or closed position. Exemplary actuators 20 may include micromachine actuators (see FIG. 2) or electrostatic comb drives (see FIGS. 3A–3B). Electrostatic comb drives include two stationary stators 24 that are separated by a distance at least as a large as the possible opening in the shutters 14, where the shutters 14 include two sliders 26 that move relative to the stationary stators 24 based on a magnitude of a voltage applied thereto. For instance, as shown in FIGS. 3C and 3D, the stators 24 and slides 26 each have comb parts, the proximity of the comb parts of the shutter and the comb parts of the actuator being based on whether the shutter is opened or closed. When electrostatic comb drives are used, springs 22 are not necessary for biasing the shutters 14, rather a voltage or lack thereof can be used to bias the shutters 14 into an opened or closed position.

In step 44, an array of first lenses 10 corresponding to the array of shutters 14 is assembled for focusing incident light upon the non-transparent surface 12. In step 45, the array of first lenses 10 is positioned relative to the non-transparent surface 12 such that the incident light is focused upon the shutters 14 by the first lenses 10. In step 46, an array of second lenses 16 corresponding to the array of shutters 14 is assembled for collimating the incident light passing through the shutters 14.

To fabricate the shutters within the array assembled in step 41 of FIG. 4, several processes may be used. One process used to fabricate there shutters is to use reactive ion etching (RIE). In this method, a plasma etching gas is used to etch a first material rapidly while etching a second material very slowly, the second material being known as a mask material. As such, the structure of the shutter can be constructed using known photolithographic methods like the methods used for making microelectronic circuits. In fact, using this method, several structures can be made on a single substrate in a manner similar to the method of making several microcircuits on a single substrate.

Figure 5A:
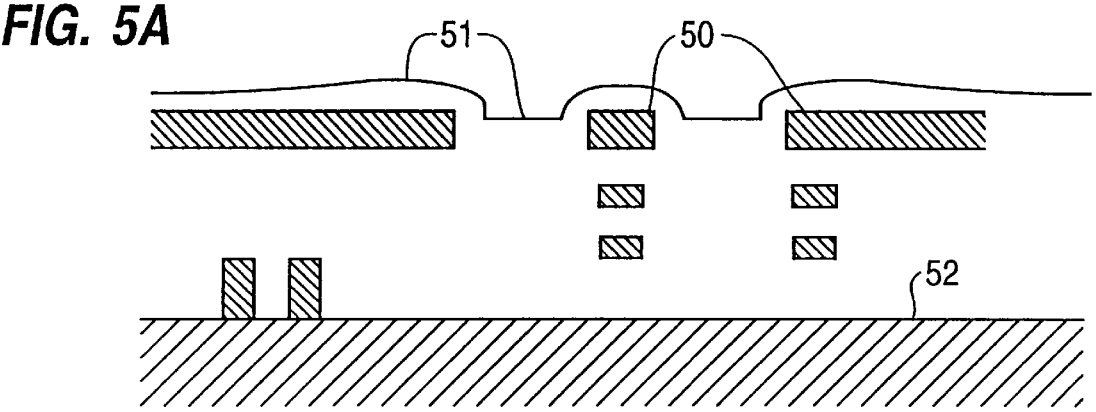
FIGS. 5A–5C illustrate steps in an exemplary process for manufacturing comb parts of a shutter according to the present invention.
Figure 5B:
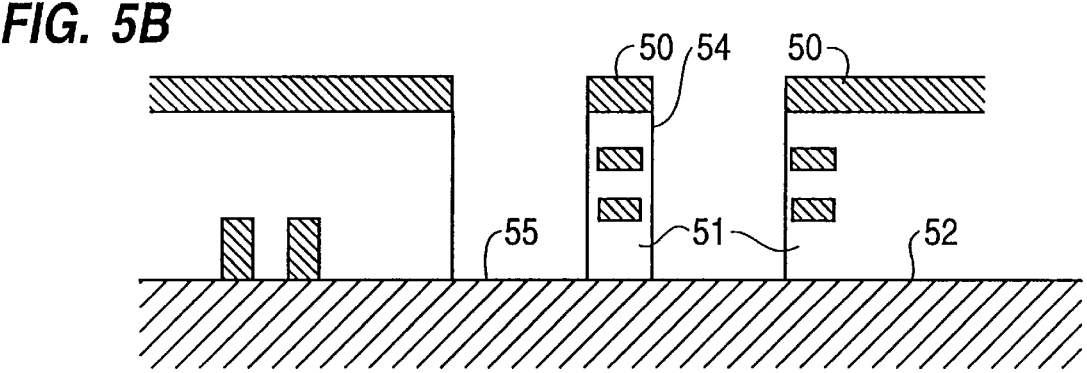
Figure 5C:
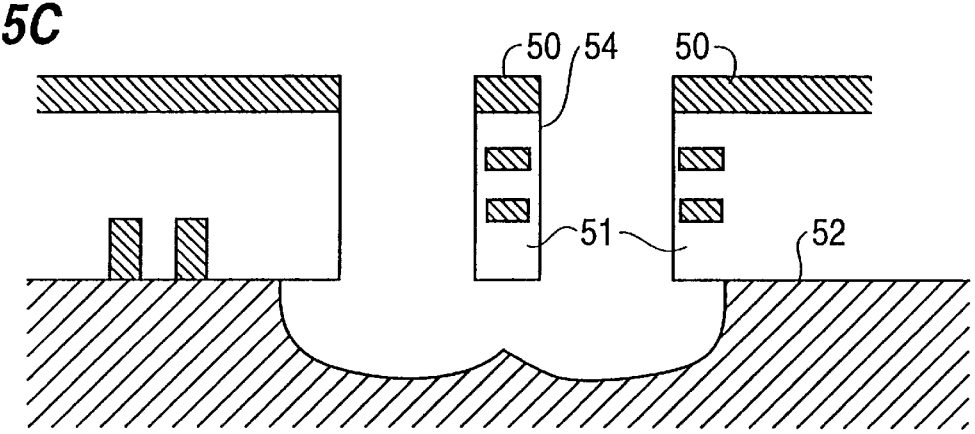

More specifically, a method of fabricating a single shutter within the array assembled in step 41 of FIG. 4 is described hereinafter with respect to FIGS. 5A–5C. As shown in FIG. 3B, FIGS. 5A–5C represent a cross-sectional view of a portion of the comb part on slide 26 of the shutter. A such, for reference purposes, the resulting comb part 54 shown in FIG. 5C is moved into the page or out from the page by an actuator in order to open and close the shutter. Although not shown in FIGS. 5A–5C, the simultaneous fabrication of the body of the slider 26 upon which the comb part 54 is engaged will also be described hereinafter.

In the first step of the fabrication process shown by FIG. 5A, a CMOS microcircuit is fabricated with at least one mask layer 50 positioned within silicon dioxide layer 51 above silicon substrate 52. The CMOS microcircuit may be fabricated using standard available processes such as those commonly used by Intel, HP, Orbit Semiconductor, etc.

The second step involves lithographically etching the silicon dioxide layer 51, e.g., using RIE with $CHF_3$ and $O_2$ gases, thereby exposing a substrate surface region 55 as shown by FIG. 5B. In a region behind that shown in FIG. 5B, the etching of the silicon dioxide layer 51 exposes the body of slider 26 to which the illustrated layer is attached, and under which a substrate aperture is formed.

In the third step, illustrated by FIG. 5C, the structure 54 is isolated from the substrate 52 by etching the substrate surface 55 to a depth of approximately 10 microns using either $XeF_2$ or $SF_6$, thereby undercutting the silicon dioxide $SiO_2$ upon which the mask layer(s) 50 are narrowly formed. The resulting freestanding structure identified by reference numeral 54 represents the comb part of the comb drive. The comb part 54 of the comb drive moves in response to an electrostatic force resulting from the application of voltage. The springs or other biasing elements installed in steps 45 and 46 may also be made of the same $SiO_2$ metal as the above-described combs.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a continuation or divisional application.

What is claimed is:

1. An apparatus for controlling light, comprising:
    a micromachined shutter positioned over an aperture in a non-transparent substrate for regulating light passing through the aperture of the non-transparent substrate; and
    a micromachined comb drive actuator for opening and closing the micromachined shutter.

2. The apparatus recited by claim 1, wherein the micromachined shutter is fabricated using lithographic techniques.

3. The apparatus recited by claim 1, wherein the micromachined shutter includes at least one slider that is moved relative to a stationary stator based on the micromachined comb drive actuator to modulate light passing therethrough.

4. The apparatus recited by claim 1, wherein the shutter and the comb drive actuator each include comb parts, the proximity of the comb parts of the shutter and the comb parts of the actuator being based on whether the shutter is opened or closed.

5. The apparatus recited by claim 1, wherein:
    the micromachined shutter is part of an array of micromachined shutters positioned on the non-transparent substrate for regulating light passing through the non-transparent substrate; and
    the micromachined comb drive is part of an array of micromachined comb drive actuators, each driving an associated one of the micromachined shutters within the array of micromachined shutters.

6. The apparatus recited by claim 1, wherein the micromachined shutter is adapted for use in a printing device.

7. A shutter formed by the process of:

providing a non-transparent substrate with an aperture defined therein and at least two layers deposited thereon; and lithographically etching a portion of a first layer and a portion of the substrate to isolate a freestanding portion of the second layer with respect to the substrate, the freestanding portion of the second layer forming a portion of the shutter which is positioned over the aperture and which is moved with respect to the substrate to control incident light passing through the aperature of the substrate.

8. The shutter recited by claim 7, wherein the process of lithographically etching the portion of one layer and the substrate comprises:

etching a portion of the first layer to expose at least two surface portions of the substrate; and etching a portion of the substrate to isolate a freestanding portion of the second layer with respect to the substrate.

9. The shutter recited by claim 7, wherein the freestanding portion of the second substrate is a comb part that is moved relative to a comb part of the substrate to actuate the shutter.

10. The shutter recited by claim 7, wherein the process further comprises:

lithographically etching a different region of the first layer and the substrate to isolate another freestanding portion of the second layer used to bias the shutter position.

11. An apparatus for controlling light comprising:

a non-transparent surface for blocking incident light;

an array of first lenses for focussing the incident light upon the non-transparent surface; and an array of shutters corresponding to the array of first lenses and positioned on the non-transparent surface for controlling passage of the incident light through the non-transparent surface, wherein the shutters are separated from the first lenses by a distance equal to a focal distance of the first lenses such that the incident light is focussed by the first lenses onto the shutters.

12. The apparatus recited by claim 11, further comprising:

an array of second lenses corresponding to the array of shutters for collimating the incident light passing through the shutters.

13. The apparatus recited by claim 11, wherein the shutters are opened and closed to control the intensity of the incident light passing therethrough.

14. The apparatus recited by claim 13, further comprising:

electrostatic comb drives corresponding to the array of shutters for actuating the shutters.

15. The apparatus recited by claim 14, wherein:

the electrostatic comb drives each comprise two stationary stators that are separated by a distance at least as great as a largest shutter opening, and the shutters each comprise two sliders that move relative to the stationary stators based on a magnitude of a voltage applied thereto.

16. The apparatus recited by claim 13, further comprising:

return springs for biasing the shutters within the array of shutters in an open or closed position; and micromachine actuators for controlling actuation of the shutters within the array of shutters.

17. The apparatus recited by claim 13, wherein shutters within the array of shutters are Foucault shutters.

18. The apparatus recited by claim 11, wherein the apparatus is adapted for use in a printing device.

* * * * *